United States Patent [19]

Stannard

[11] Patent Number: 4,828,274
[45] Date of Patent: May 9, 1989

[54] SEALING ASSEMBLY FOR MANHOLE COVERS AND ADJUSTMENT RINGS THEREFOR

[75] Inventor: Edward C. Stannard, Medley, Fla.

[73] Assignee: U.S. Foundry & Manufacturing Corp., Medley, Fla.

[21] Appl. No.: 133,847

[22] Filed: Dec. 14, 1987

[51] Int. Cl.⁴ .................... B65D 53/00; F02D 29/14; F16J 15/10
[52] U.S. Cl. .................... 277/171; 49/489; 52/20; 220/378; 277/180; 404/25
[58] Field of Search .................... 220/378; 52/20; 277/180, 171, 172, 177; 49/489; 404/25

[56] References Cited

U.S. PATENT DOCUMENTS

| | | | |
|---|---|---|---|
| 2,444,119 | 6/1948 | Thorn et al. | 277/177 |
| 2,783,068 | 2/1957 | Bloom et al. | 277/177 |
| 3,144,035 | 8/1964 | Hoblanian et al. | 277/59 X |
| 3,248,119 | 4/1966 | Smith et al. | 277/180 |
| 3,366,392 | 1/1968 | Kennel | 277/177 |
| 3,575,431 | 4/1971 | Bryant | 277/171 |
| 4,101,236 | 7/1978 | Meyer | 404/25 |
| 4,188,151 | 2/1980 | Hall | 404/25 |
| 4,304,415 | 12/1981 | Wolf et al. | 277/177 X |
| 4,534,570 | 8/1985 | Munde | 277/177 X |

Primary Examiner—Allan N. Shoap
Attorney, Agent, or Firm—John Cyrill Malloy

[57] ABSTRACT

A sealing assembly particularly of the type used with a manhole cover or a height adjustment ring or structure for a manhole cover to facilitate a liquid type seal between the sealing surface of the cover and the mating surface of a support frame on which it rests. The assembly comprises specifically corresponding and cooperatively dimensioned transverse dove tail configured groove and gasket arrangements both carried by the manhole cover wherein an outer peripheral portion of the gasket extends outwardly for sealing engagement with the mating surface on which the manhole cover rests when in its closed position.

3 Claims, 2 Drawing Sheets

SEALING ASSEMBLY FOR MANHOLE COVERS AND ADJUSTMENT RINGS THEREFOR

BACKGROUND OF THE INVENTION

1. Field of the Invention

This invention relates to a sealing assembly particularly to be used in combination with a manhole cover to facilitate a fluid tight seal between the inner surface of the cover and the mounting ring surrounding the manhole on which the cover rests. Cooperatively configured and dimensioned groove and gasket structures are carried by the cover to facilitate an efficient seal and a long lasting and reliable sealing assembly to accomplish such seal.

2. Description of the Prior Art

The use of covers for the closing and covering of manholes is, of course, common practice. It has been found, however, that rain water or other occumulated ground water can enter the hole through vents or apertures purposely formed in the manhole cover for purposes of venting gasses or for purposes of removing the manhole from its covering position relative to the hole. In addition, rain water can enter around the edge of a manhole cover and enter the sewer, because many manhole covers are not equipped with any type of peripheral inner surface sealing structure. Without such a sealing structure or facility associated with the manhole cover the surface to surface contact usually is not sufficiently water proofed to prevent the entry of such rain water. This is particularly true if the manhole cover and cover frame have been in service for some time resulting in imperfections or inconsistencies in the mating surfaces.

In an attempt to overcome problems existing in the prior art of the type set forth above a sealing manhole cover for use on existing unsealed sanitary sewer manhole cover frames of the type disclosed in the U.S. Pat. No. 4,101,236 to Meyer, was devised. This structure relates to a sealing means in the form of an o-ring groove having a rectangular transverse configuration and dimensioned to receive an o-ring type gasket and having a depth slightly more then one half the thickness of the o-ring gasket and a width substantially equal to the width of the gasket such that the gasket is slightly compressively held in place in the groove with a portion of the gasket extending beyond the groove when the gasket is not compressed into its sealing position.

While operative for its intended function, the structure of the type disclosed in the above set forth patent includes certain recognized disadvantages as set forth in greater detail hereinafter.

If the sealing gasket is held in place by compression it is usually stretched, linearly to reduce the diameter thereof for easy installation into the holding groove. Friction on the sides of the groove prevents the gasket from going back to its original length. Over a period of time, portions of the gasket pull apart leaving a gap through which water can leak. This same stretching or linear expansion due to the resiliency of the material from which the gasket is formed, and normally applied to the gasket at the time of installation into the groove, if not uniform along its length, causes conventional gaskets to vary in diameter after placement into the interior of the groove. This means that the contact surface of the gasket is frequently not consistently flat along its length resulting in possible leak. In addition, gaskets which are held within the groove by compression, may not be seated in the bottom of the groove causing the contact surface of the gasket not to be flat. Other structures and practices prevalent in the prior art sometimes include the maintenance of the gasket within the groove using an adhesive or glue. Such use makes it impossible to replace a damaged gasket thereby necessitating extensive time for repair or replacement.

Accordingly, there is a need in this area for an improved sealing assembly for use in the environment as set forth above which provides proper sealing characteristics for an extended period of time and with an increased reliability.

SUMMARY OF THE INVENTION

The present invention relates to a sealing assembly of the type used to facilitate a liquid type seal between a manhole cover and the frame on which the inside surface of the cover rests. The purpose of the seal is well recognized in the industry for the purpose of preventing or at least seriously reducing the amount of water leaking between the outer periphery of a manhole cover and the opening which it closes. At the same time, the sealing assembly of the present invention may also be used in combination with adjustment rings or height adjusting structures positioned within the supporting frame about the periphery and extending upwardly therefrom so as to effectively raise the height of the entire manhole cover and frame on which it is mounted. The purpose of the subject sealing assembly in the latter instance or embodiment is the same, namely; to prevent excessive passing of water between the outer periphery of the manhole cover and the frame on which it is mounted when positioned in covering or closing relation over the access hole or "manhole" leading to the sewer.

The sealing assembly of the present invention comprises an integrally formed groove having an angular configuration and formed on the inner surface of the manhole cover in a continuous, endless configuration. This groove has a transverse, dove tail configuration generally corresponding to a somewhat similar transverse configuration of a continuous, endless sealing gasket ring disposed within the groove. The relative dimensions and cooperative configuration of the gasket ring and groove are such as to allow an effective "loose" fit of the gap within the groove to the extent that confrontational surfaces of the gasket and the groove are sometimes disposed in spaced relation to one another thereby accomplishing the aforementioned loose fit there between. An outer peripheral portion of the gasket protrudes outwardly from an open mouth of the groove into mateable and sealing engagement with a mating surface of the frame on which the manhole cover is positioned when disposed in its hole covering or closing disposition. It has been found that when the gasket is loosely fitted within the groove it deforms more easily under the weight of the cover when the cover is disposed in covering relation to the manhole. The gasket being formed of resilient material, assumes its compressed and sealed orientation.

The portion of the gasket protruding outwardly from the mouth of the groove tapers away from what may be considered generally sharp, free, peripheral edges of the groove. This prevents these edges from cutting the gasket and reducing its effectiveness. In addition to the above, the transverse configuration and external surface shape of the gasket particularly including the outwardly extending peripheral portion thereof gives a broader bearing surface then a transversely configured round gasket having a transverse dimension substantially the same as the transverse dimension of a rectangular groove. The broader bearing surface helps resist wear to the gasket.

The invention accordingly comprises the features of construction, a combination of elements, and an arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF PREFERRED EMBODIMENT

The present invention is directed towards a sealing assembly particularly of the type used to effect a seal between the inner sealing surface on a manhole cover 12 and a corresponding supporting and mating surface of a supporting frame 28 disposed in overlying relation to a manhole 30 leading down to a sewer facility or the like. Such sealing assembly is specifically designed to reduce the amount of ground water leaking into the sewer facility through the aforementioned manhole about the periphery of the manhole and between the sealing surface of the cover and the mating surface of the cover support frame 28.

Figure 1:
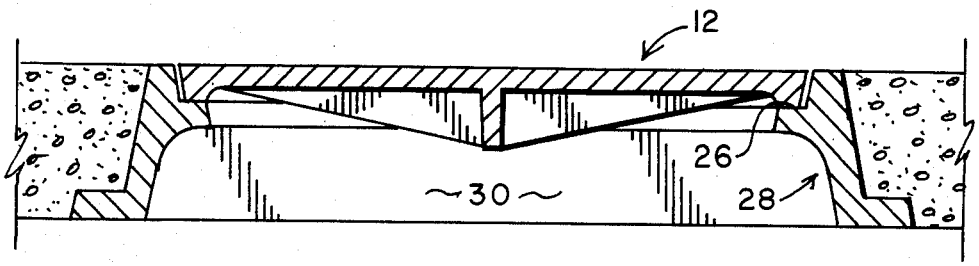
FIG. 1 is a cross sectional view of a manhole cover mounted in mating engagement on a supporting frame and an overlying and covering relation to a manhole leading to a sewer or like facility.
Figure 2:
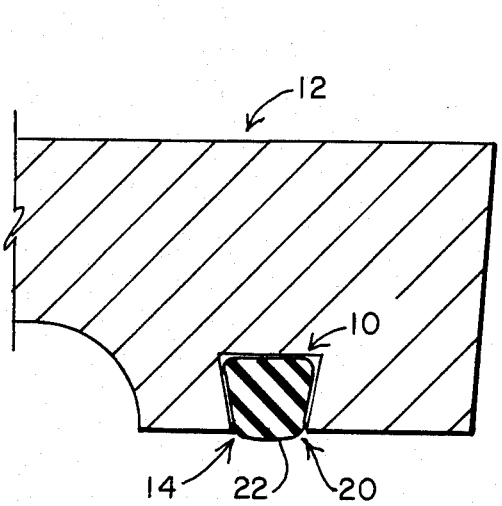
FIG. 2 is a sectional view in partial cut-away showing details of the sealing assembly associated with the cover and supporting frame therefore.
Figure 3:
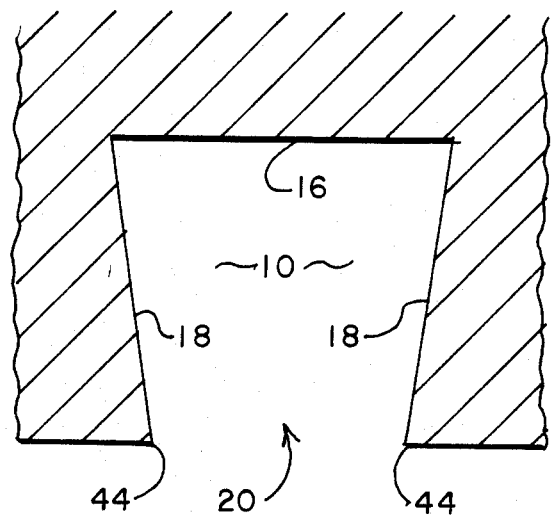
FIG. 3 is a detailed view in section and partial cutaway of a receiving groove formed in the manhole cover.
Figure 4:
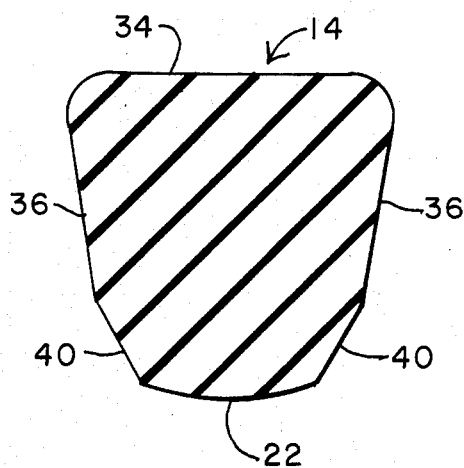
FIG. 4 is a sectional view showing structure details of a sealing gasket being part of the sealing assembly of the present invention.
Figure 6:
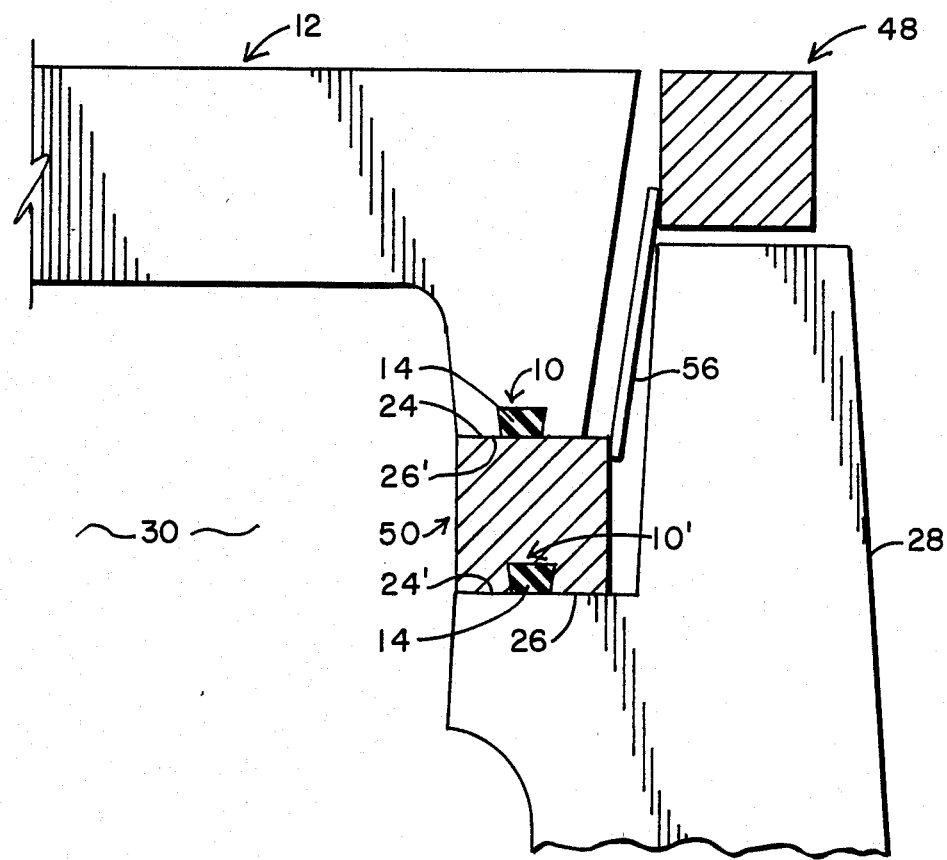
FIG. 6 is a sectional view in partial cutaway showing the relative positions of the sealing assembly used in cooperation with the cover, the adjustment ring and the supporting frame on which they are mounted.

Accordingly, the present invention includes an integrally formed groove of endless, continuous and preferably angular configuration formed on the inner mating surface of the cover and spaced at least minimally inwardly from the peripheral edge of the cover so as to be disposed in sealing engagement with the mating and supporting surface of the support frame overlying and at least partially defining the manhole leading to the sewer. An important feature of the present invention is the provision of a substantially "dove tail" transverse, cross-sectional configuration of the groove extending along its entire length. And, as shown in FIGS. 2, 3 and 6, the groove generally indicated as 10 is shown in the inner surface of the cover 12 and the elongated gasket generally indicated as 14 is disposed loosely on the interior of the groove 10 in its operative and potentially sealing position. With reference to FIGS. 2, 3 and 4, the groove 10 comprises a base surface 16 and two angularly converging side surfaces 18 extending continuously from the base 16 and terminating in an open face 20 through which a peripheral portion 22 of the gasket 14 protrudes to establish sealing engagement between the sealing inner surface 24 of the cover 12 and a correspondingly positioned mating surface 26 of the support frame 28 or a portion of the adjustment ring as at 50 when the cover 12 covers the hole 30 leading to sewer facilities (see FIG. 6). The gasket 14 also has an endless, substantially angular configuration substantially equal to that of the groove such that the gasket 14 is operatively positioned in the groove 10 as shown in FIG. 2. With reference to FIGS. 2, 3 and 6, the gasket 14 is formed from a resilient material capable of effecting a seal when forced into sealing engagement with the mating surface 26 of the frame 28 (see FIG. 1). The transverse cross-sectional configuration of the gasket 14 is such as to include a base portion 34 and two side portions 36, each angularly converging towards one another to a point of termination at the peripheral portion 22. The peripheral portion 22 defines most of the sealing surface as it is forced into a compressed and distorted configuration once in its sealing position against the mating surface 26 of the support frame 28. With regard to FIGS. 2-4, the base portion 34 is disposed substantially adjacent to but spaced from the base surface 16 of the groove 10. Similarly, the converging side portions 36 are disposed in substantially adjacent but somewhat spaced relation inwardly from the side surfaces 18 when the gasket is in its non-sealing or relaxed position. The gasket 14 is sized to fit within the groove 10 and normally be capitively supported by a portion of the side surfaces of the groove with part of the side portions of the gasket spaced from the side surfaces of the groove. FIG. 2 shows the configuration of the gasket relative to the side surfaces of the groove but centered for illustrative purposes. It will be appreciated that in actual assembly the gasket will at all times have a part of its side portions in abutting engagement with a portion of the side surfaces of the groove.

The peripheral portion 22 extends outwardly from the open face 20 of the groove 12 as set forth above. The side portions, in transverse cross-section as shown in detail in FIG. 4, have a further inwardly angled or converging orientation 40 and, therefore, may be considered somewhat beveled inwardly to their termination point with the peripheral surface 22. This inward beveled or angled orientation of the ends 40 of the side portions 36 is to maintain the side portions, at this local out of conflicting engagement with the free ends 44 of the side surfaces 18 of the groove 10. It should be readily apparent that when the peripheral portion 22 is forced into its compressed sealing position against the mating surface 26 of the support frame 28 there would be constant engagement between the ends of the side portions 36 in the region of the ends 40 and the free ends at the open face 44 of groove 10. However, because of the inwardly angled orientation or beveled configuration of the ends 40 of side portions 36, contact with the relative sharp, free ends 44, along their entire lengths, is prevented or reduced. Therefore, the operable life of the gasket is extended considerably since the cutting or deterioration of the gasket at the general region of the beveled ends 40 is eliminated.

Figure 5:
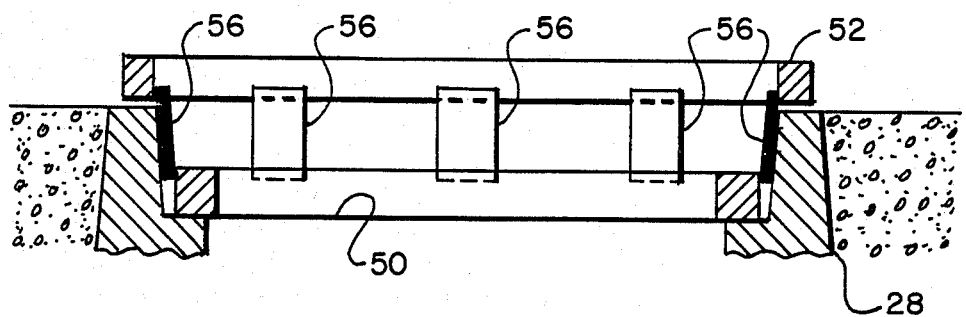
FIG. 5 is a sectional view of an adjustment ring or structure which may be used in combination with the cover and supporting frame structure of the present invention so as to adjust the height thereof.

In certain practical everyday usage an adjustment structure or ring (see FIGS. 5 and 6) is common practice when raising the height of the cover 12 when in its sealing position as shown. In such a situation, when the adjustment ring, generally indicated as 48, is utilized the lower or supporting portion thereof generally indicated as 50 may have an integrally formed groove 10' formed therein wherein such groove is designed to maintain a gasket structure of the type shown in detail in FIG. 4. From a review of FIG. 6, it should be obvious that the sealing assembly of the present invention, including the dove tail configured groove 10 or 10' and the substantially dove tail configured gasket 14 and 14', may be used both in the cover and support frame 12 and 28 (FIG. 1) or when the cover and support frame are used in combination with a height adjustment ring generally indicated as 48 (FIG. 6).

Other structural details of the ring include the upper or outer portion 52 sitting on the outer exposed surface of the support frame 28 and being connected to the lower portion 50 by a plurality of spaced apart stainless steel retaining bands 56.

Now that the invention has been described,

What is claimed is:

1. In a sealing assembly for use in combination with a manhole cover of the type removably positioned in covering and sealing relation to a manhole, wherein the sealing assembly includes an integrally formed groove having an elongated configuration along its configurative extent and extending continously along a sealing surface on the manhole cover for sealing engagement with a mating surface along the periphery of a manhole opening; an improvement comprising:
   (a) said groove including a substantially transverse, dove-tail configuration along its configurative extent, said dove-tail configuration defined by an interior base surface and two spaced apart side surfaces extending from said base surface angularly outward in a cooperative, converging orientation to oppositely disposed free ends and defining an open face thereof,
   (b) said base surface being disposed in substantially parallel relation to said open face and having a greater transverse dimension than said open face and extending along a common length thereof,
   (c) a gasket formed of resilient material and loosely mounted within said groove and protruding outwardly therefrom into sealing engagement with said mating surface,
   (d) said gasket including transverse configuration extending substantially along its configurative extent, said transverse configuration of said gasket defined by a base portion disposed adjacent to said base surface and two side portions each disposed adjacent a correspondingly positioned side surface of the groove and extending angularly away from said base portion in substantially converging orientation, said side portions including outer ends each configured to extend angularly away from said free ends of said side surfaces in spaced relation thereto, said outer ends being in substantially converging orientation
   (e) said transverse configuration further comprising a peripheral portion having a substantially curvilinear transverse outer surface configuration extending continuously between corresponding outer ends of said side portions and disposed to protrude outwardly from the groove through said open face and into sealing engagement with the mating surface, the distance from said base portion to said outer ends at said side portions being greater than the distance from sid outer ends at said side portions to said peripheral portion at said outer ends,
   (f) said base portion having a larger transverse dimension than the transverse dimension of said open face as measured between said free ends of said side surfaces, and
   (g) said base portion having a lesser transverse dimension than the transverse dimension of said base surface, said base portion disposed within the groove in spaced relation to said base surface without resilient linear extension of said gasket when said groove faces but is spaced from said mating surface,
   (h) said gasket having a lesser transverse dimension portions at a location adjacent said free ends- of said side between said outer ends of said side of said gasket disposed in inwardly spaced relation to said side surfaces of the groove along at least a portion of the transverse dimension of said side portions without resilient linear extension, of any part of the gasket when said groove faces but is spaced from said mating surface, and
   (i) said peripheral portion disposed in fluid sealing engagement with said mating surface when the sealing surface of the cover is disposed in adjacent engagement with the mating surface.

2. An assembly as in claim 1 wherein said outer ends of said side portions each define a beveled distal end extending angularly inward from a remainder of said respective side portion to said peripheral portion and in spaced relation to a correspondingly positioned free end of said side surfaces.

3. In a sealing assembly for use in combination with a manhole cover of the type removably positioned in covering and sealing relation to a manhole, wherein the sealing assembly includes a height adjustment structure for effectively positioning the height of the manhole cover with respect to the level of a surface surrounding the manhole, and an integrally formed groove having an elongated configuration along its configurative extent and extending continuously along a sealing surface on the manhole cover for sealing engagement with a mating surface along the periphery of a manhole opening; and improvement comprising:
   (a) a height adjustment ring including an upper and lower portion, said upper portion being connected to said lower portion by a plurality of retaining bands,
   (b) said lower portion including an integrally formed groove including a substantially transverse dovetail configuration along its configurative extent and extending continuously along said sealing surface thereof, said dove-tail configuration defined by an interior base surface and two spaced apart side surfaces extending from said base surface angularly outward in a cooperative, converging orientation to a oppositely disposed free ends and defining an open face thereof,
   (c) said base surface being disposed in substantially parallel relation to said open face and having a greater transverse dimension than said open face and extending along a common length thereof,
   (d) a gasket formed of resilient material fixedly mounted within said groove of said lower portion and protruding outwardly therefrom into sealing engagement with said mating surface, (e) said gasket including a transverse configuration extending substantially along its configurative extent, said transverse configuration of said gasket defined by a base portion disposed adjacent to said base surface and two side portions each disposed adjacent a correspondingly positioned side surface of the groove and extending angularly away from said base portion in substantially converging orientation, said side portions including outer ends each configured to extend angularly away from said free ends of said side surfaces in spaced relation thereto, said outer ends being in substantially converging orientation, (f) said transverse configuration further comprising a peripheral portion having a substantially curvilinear transverse outer surface configuration extending continuously between corresponding outer ends of said side portion and disposed to protrude outwardly from the groove through said open face and into sealing engagement with the mating surface, the distance from said base portion to said outer walls at said side portions being greater than the distance from said outer ends as said side portions to said peripheral portion at said outer ends, (g) said base portion having a larger transverse dimension than the transverse dimension of said open face as measured between said free ends of said side surfaces, (h) said base portion having a lesser transverse dimension than the transverse dimension of said base surface, said base portion disposed within the groove in spaced relation to said base surface without resilient linear extension of said gasket when said groove faces but is spaced from said mating surface, (i) said gasket having a lesser transverse dimension between distal ends of said side portions at a location adjacent said free ends of said side surfaces than the transverse dimension between said free ends, said side portions of said gasket disposed in inwardly spaced relation to said side surfaces of the groove along at least a portion of the transverse dimension of said side portions without resilient linear extension of any part of the gasket when said groove faces but is spaced from said mating surface, (j) said peripheral portion disposed in fluid sealing engagement with said mating surface when the sealing surface of the cover is disposed in adjacent engagement with the mating surface.

* * * * *